No. 871,548. PATENTED NOV. 19, 1907.
J. D. WILLIAMSON, Jr.
ATTACHMENT FOR STEERING GEARS.
APPLICATION FILED MAY 9, 1907.
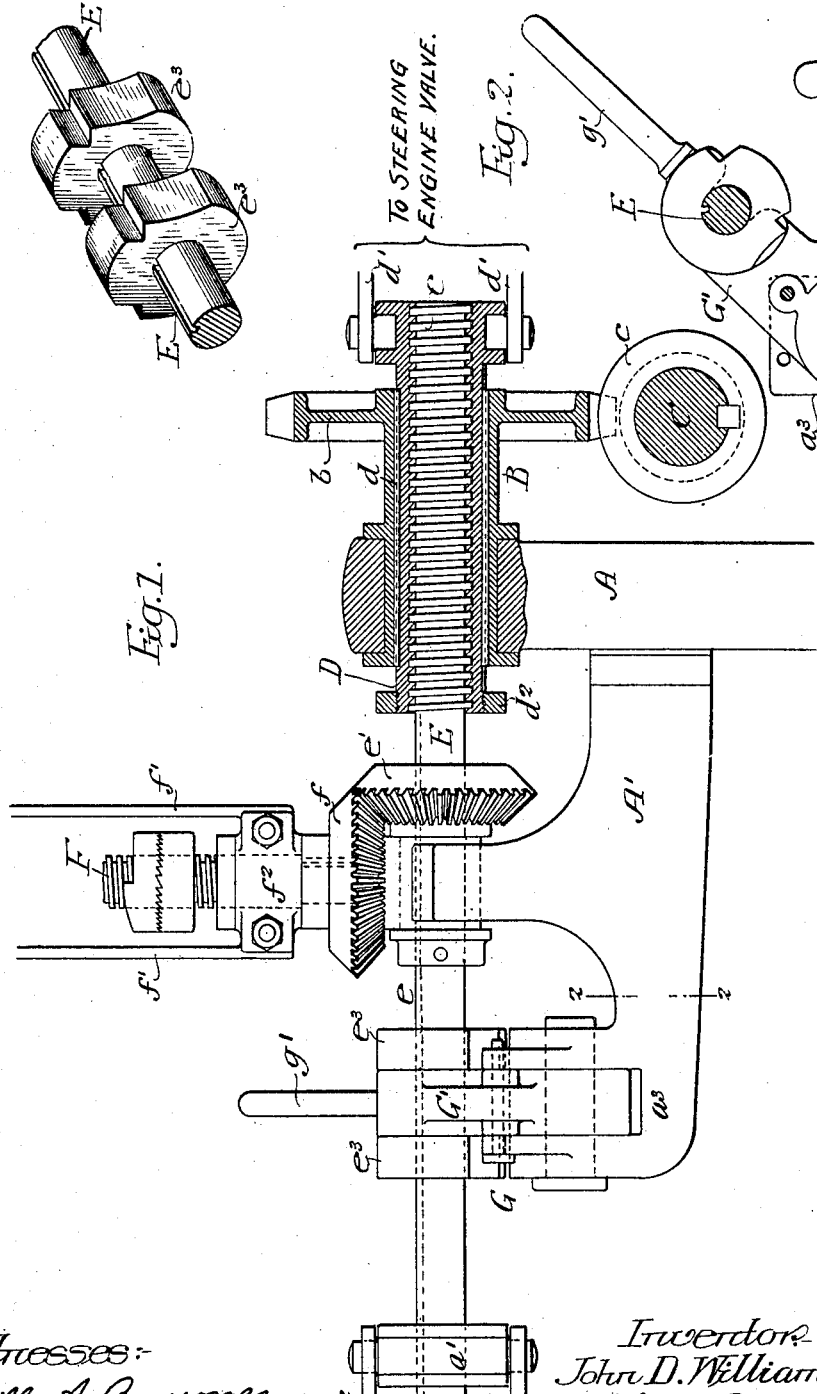

UNITED STATES PATENT OFFICE.

JOHN D. WILLIAMSON, JR., OF PHILADELPHIA, PENNSYLVANIA, ASSIGNOR TO WILLIAMSON BROS. COMPANY, OF PHILADELPHIA, PENNSYLVANIA, A CORPORATION OF PENNSYLVANIA.

ATTACHMENT FOR STEERING-GEAR.

No. 871,548.  Specification of Letters Patent.  Patented Nov. 19, 1907.

Application filed May 9, 1907. Serial No. 372,734.

*To all whom it may concern:*

Be it known that I, JOHN D. WILLIAMSON, Jr., a citizen of the United States, residing in Philadelphia, Pennsylvania, have invented certain Improvements in Attachments for Steering-Gear, of which the following is a specification.

One object of my invention is to provide mechanism whereby the valve controlling mechanism of an engine controlling the rudder of a vessel may be conveniently connected to or disconnected from either a hand operated steering wheel or a telemotor such as is frequently employed in this particular class of mechanism; it being especially desired that the apparatus shall be relatively simple in construction and easily manipulated. These objects I attain as hereinafter set forth, reference being had to the accompanying drawings, in which:—

Figure 1, is a side elevation, partly in vertical section, illustrating one form of my invention; Fig. 2, is a vertical section on the line 2—2, Fig. 1 and Fig. 3, is a perspective view of the device whereby one of the shafts of the mechanism may be held either from rotation on the one hand, or from longitudinal movement on the other hand.

In the above drawings, A represents a supporting structure designed to provide a bearing for the elongated tubular hub B of a worm wheel $b$; this hub being provided with suitable flanges for holding it in the bearing and in the present instance being extended so as to support said worm wheel a considerable distance from it. Said worm wheel is designed to mesh with a worm $c$ on the main shaft C of the steering engine, and, with the hub B, provides a tubular support within which is mounted a longitudinally movable sleeve D; there being feathers $d$ whereby said sleeve and hub are connected so as to be compelled to turn together. One end of said sleeve is provided with two flanges to form an annular groove for the reception of structures $d'$ connected to the valve of the steering engine, while the opposite end is provided with a flange $d^2$, whereby its movement within the hub B is limited; it being noted that between the limits fixed by its double flanged end and the flange $d^2$ said sleeve D has sufficient length to permit it to move longitudinally within the hub B through a distance sufficient to move the engine valve from its closed to its open position or vice versa.

The interior of the sleeve D is threaded for the reception of a screw $e$ formed on a shaft E, which passes through the hub of a beveled gear $e'$ mounted in a bracket A', which, in the present instance, is supported upon the structure A. Said gear wheel is connected to the shaft E by a feather, whereby said shaft is free to move through it, while being compelled to turn when said gear is turned. The second beveled gear wheel $f$ meshes with the gear $e'$ and is fixed to a shaft F extending at right angles to the shaft E; there being connecting means, such as rods $f''$ and a clamp structure $f^2$, whereby the gear $f$ may be turned from the hand steering mechanism, which may be of any desired form.

It will be noted that the shaft E is extended beyond its bearing in the bracket A' and has connected to it a clamp $a'$ and connecting rods $a^2$, whereby it may be moved longitudinally from hydraulic apparatus, such as a telemotor, or by other means.

In order that the shaft F be held from rotating when the telemotor is employed to control the steering engine, and to prevent longitudinal movement of said shaft when the hand wheel is used, I provide the mechanism shown at G, Fig. 1, and further illustrated in Figs. 2 and 3. This consists of a lever G' pivotally mounted upon an extension $a^3$ of the bracket A' and having a handle $g'$ whereby it may be operated. The two arms of this lever G' are differently formed; the one having the handle $g'$ being shaped to fit between the pair of collars $e^3$ on the shaft E so as to permit rotation of this latter while effectually preventing any possible longitudinal movement thereof. It will be noted that said collars are of irregular shape so as to receive the second arm $g^2$ of the lever in such manner as to prevent the rotation of the shaft E, while permitting it to move longitudinally to a limited extent. If, for example, it be desired to operate the valve of the engine by means of the hand wheel, the handle $g'$ is thrown so that the lever engages the shaft E in the manner indicated in Fig. 2. Under these conditions, any revolution of the hand wheel will cause a revolution of the beveled gears $f$ and $e'$, and therefore the turning of the shaft E.

Inasmuch as the sleeve D is connected by its feather $d$ to the hub B and said hub is held from turning by the worm wheel $b$ and the worm $c$, such revolution of the shaft E serves to move the said sleeve D longitudinally in such a direction as to open the valve of the engine. Said engine will, therefore, be started and will turn its main shaft C, thereby not only moving the rudder to which it is attached into some predetermined position, but also so turning the worm wheel $b$ through the worm $c$ as to move the sleeve D upon the threaded portion of the shaft E sufficiently to again close the engine valve and stop the operation of the engine, in the manner well understood in this particular art. If, on the other hand, it be desired to control the engine from the telemotor, I throw the lever G' so that its arm $g^2$ engages the collar $e^3$ on the shaft E. Then, when said telemotor is actuated in the well known manner, the shaft E is moved longitudinally, since it is free to slide through the beveled gear $e'$. In view of the fact that the sleeve D is threaded upon said shaft, it is compelled to move therewith, sliding through the hub B and consequently opening the valve of the engine as before. In this case revolution of the engine shaft, as before, turns the worm wheel $b$, hub B and sleeve F, and, since revolution of the shaft E is prevented by means of the lever $g^2$, said sleeve turns upon the screw of said shaft until the rods A' have been sufficiently moved to close the engine valve.

From the above, it will be understood that I have provided a relatively simple and easily manipulated device for connecting the valve operating mechanism of the engine so that it will be under the control, either of the telemotor or of the hand steering wheel, as desired.

I claim:

1. Mechanism for controlling the valve of a steering engine, including a shaft, means for turning said shaft to operate the valve, and means for longitudinally moving the shaft to similarly operate said valve, with a device for preventing turning of the shaft when the device for longitudinally moving it is in use and vice versa, and means for automatically returning the shaft to its normal position after it has been operated substantially as described.

2. The combination in mechanism for operating the valve of an engine including a longitudinally movable structure connected to said valve, a shaft having a threaded portion engaging said structure, a device for turning said shaft, and a second device for longitudinally moving the shaft, with means for holding said shaft at will to prevent either its longitudinal movement or its rotation as desired, and means for automatically returning the shaft to its normal position after it has been operated substantially as described.

3. The combination of a shaft having supporting means constructed to permit of its rotation, and also of its longitudinal movement, a steering mechanism operated by said shaft, means for longitudinally moving the shaft, and other means for turning said shaft, with means for holding said shaft at will to prevent either its rotation or its longitudinal movement, and means for automatically returning the shaft to its normal position after it has been operated substantially as described.

4. The combination of a shaft having supporting means arranged to permit of its rotation, and also of its longitudinal movement, a steering mechanism operated by said shaft, means for longitudinally moving the shaft, and other means for turning said shaft, with means for holding the shaft at will to prevent either its rotation or its longitudinal movement, said means consisting of an abutment on the shaft, and a piece constructed to engage said abutment in either of two positions, substantially as described.

5. The combination of a shaft having a supporting structure constructed to permit of its rotation and also of its longitudinal movement, a steering mechanism operated by said shaft, means for turning the shaft and other means for longitudinally moving it, a collar of irregular form fixed to the shaft, and a lever mounted so that either of its arms may be brought into engagement with said collar, one of said arms being constructed to prevent longitudinal movement of the shaft and the other to prevent its rotation, substantially as described.

In testimony whereof, I have signed my name to this specification, in the presence of two subscribing witnesses.

JOHN D. WILLIAMSON, Jr.

Witnesses:
C. D. CUSHMORE,
SAM'L FARRELL.